Patented July 28, 1953

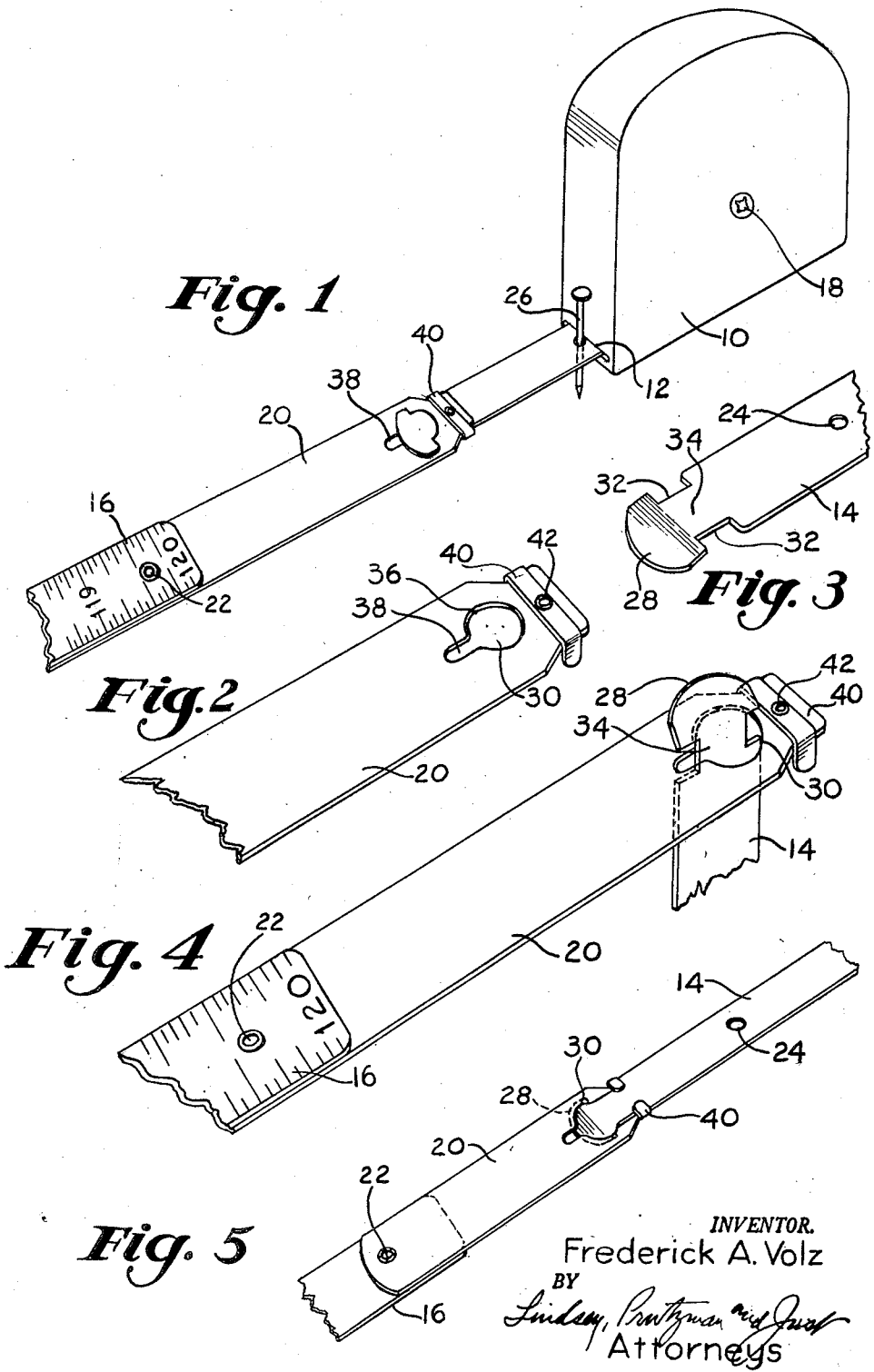

2,646,940

UNITED STATES PATENT OFFICE 2,646,940

COILABLE RULE WITH A DETACHABLE CONNECTION

Frederick A. Volz, New Britain, Conn., assignor to The Stanley Works, New Britain, Conn., a corporation of Connecticut Application September 9, 1949, Serial No. 114,726

1 Claim. (Cl. 242—84.9)

This invention relates to that class of measuring devices which includes steel tapes or coilable measuring strips or rules, and particularly those measuring devices having a steel tape or rule which is automatically wound or aided in coiling by suitable resilient means, usually in the form of a coiled spring attached at one end to the center of a container or casing within which the steel tape or rule is wound.

Steel tapes or rules of this nature are generally permanently secured to means within the casing around which they are wound or coiled. Thus, if the tape or rule should become damaged or broken, it is generally necessary to discard the entire rule including the casing therefor and replace it with another complete rule and casing or at least disassemble the case in order to replace the rule or tape which requires considerable skill and time to properly reassemble correctly.

It is an object of the present invention to provide a coilable rule or tape of the type described having quickly operable means for connecting one end of the coilable measuring tape or rule with the outer end of the coiling means mounted within the casing whereby, if the measuring tape or rule becomes damaged or broken, then it will only be necessary to replace the measuring tape or rule per se by quickly detaching the damaged or broken one from the coiling means and securing a new one to the outer end thereof, thus saving the expense of a new casing and coiling means or at least the time and skilled effort required otherwise.

It is another object of the invention to arrange said means for attaching ends of the measuring tape or rule and coiling means so that the same may be quickly and readily operated by simple and convenient tools normally found in any shop or household.

It is still another object of the invention to include in the connecting means a member which is preferably furnished with a new replacement measuring tape or rule, said member being bendable around the interconnected ends of the measuring tape or rule and coiling means, whereby the connecting means therefor cannot become accidentally separated.

Details of the invention and the foregoing objects thereof, as well as other objects thereof are set forth in the following specification illustrated in the accompanying drawing comprising part thereof.

In the drawing:

Fig. 1 is a perspective view of a fragmentary end portion of a coilable measuring tape or rule attached to coiling means projecting from one end of a casing.

Fig. 2 is a fragmentary perspective view of the end of a measuring tape or rule which is to be attached to coiling means.

Fig. 3 is a perspective fragmentary view of the outer end of coiling means which is to be attached to one end of a measuring tape or rule.

Fig. 4 is a fragmentary view illustrating one step in the operation of connecting ends of the coiling means and measuring tape or rule.

Fig. 5 is a perspective view showing fragmentary ends of the measuring tape or rule and coiling means connected together but illustrated on the reverse side from that shown in Fig. 1.

Referring to Fig. 1, a casing or holder 10 is shown having an entrance slot 12 through which one end of a coiling means 14 is extendable. Said coiling means is in the nature of a resilient spring strip and the inner end thereof within the casing is coiled and mounted in such a way that it exerts tension on the outer end of the coiling means in a direction to withdraw the same into the casing. The coiling means is attached at its outer end to one end of a flexible, coilable, measuring strip or blade 16 by means to be described, and said coiling means may be either the type which exerts a constant tension tending to draw the measuring strip 16 into the entrance slot 12, or the type such as only approximately balances the resistance due to friction and tendency of the measuring strip to resist bending such as in measuring tapes known as the "push-pull" type. The measuring strip 16 may be of the type which is normally curved in cross section when extended from the entrance slot 12.

The coiling means 14 and measuring strip 16 are coiled about an axis 18 within the casing 10. In Fig. 1 the measuring strip 16 is also shown provided with an extension 20 formed from suitable material such as highly flexible steel, and the same is secured to one end of the measuring strip 16 such as by an eyelet or rivet 22. For all practical purposes and the purposes of this invention, the extension 20 is considered part of the measuring strip 16. The coiling means 14 is also provided a short distance from its outer end with an aperture 24 through which any suitable holding means such as a pin or small nail 26 may be inserted so as to hold said outer end of the coiling means from being withdrawn into the casing when it is desired to attach one end of the measuring strip 16 to the outer end of the coiling means 14.

The means for attaching one end of the measuring strip 16 or its extension 20 to the outer end of the coiling means 14 are as follows: The outer end of the coiling means 14 is shaped to form a flat head 28 somewhat resembling a blunt arrowhead. The measuring strip 16 is provided adjacent one end with a keyhole shaped slot or opening 30. The head 28 is formed by notching opposite edges of the outer end of coiling means 14 as at 32, and the width of the neck 34 between said notches is slightly less than the diameter of the circular portion 36 of the keyhole shaped opening 30. The slot portion 38 of the keyhole shaped opening 30 is sufficiently long that, in conjunction with the circular portion 36, the head 28 of coiling means 14 may be inserted transversely therethrough as illustrated in Fig. 4. As will be apparent, head 28 might be inserted through opening 30 from either side of the blade 16. However, in order to complete the connection as hereinafter described, it is necessary to insert the head 28 from the side opposite from the indicia as shown in Fig. 4. After the head 28 has been inserted through the keyhole shaped opening 30 as shown in Fig. 4, the neck 34 of coiling means 14 is moved longitudinally of the measuring strip into the circular portion 36 of the opening 30 and then turned about the longitudinal axis of coiling means 14 approximately 90° to the position of the coiling means illustrated in Fig. 4. The coiling means and measuring strip are then extended so as to be longitudinally aligned as indicated in Figs. 1 and 5.

The thus interconnected coiling means 14 and measuring strip 16 could then be passed through entrance slot 12 and coiled within the casing 10. However, upon withdrawing the coiling means through the entrance slot 12 so as to expose the connecting means, the latter could then be accidentally disconnected. This would permit the end of the coiling means to snap into the case or holder and become uncoiled from its proper tension. To reconnect to the measuring strip would then require disassembly of the casing as described in the first object stated. To prevent such accidental disconnection of the connecting means described thus far, the present invention further contemplates the use of holding means comprising a small readily bendable metal strip 40 which is preferably U-shaped, as shown in Figs. 2 and 4, and extends transversely across the measuring strip 16, or extension 20 thereof, adjacent one end of the same as clearly shown in Figs. 2 and 4. Said holding means 40 is connected to the measuring strip or its extension by an eyelet or rivet 42 so as to be permanently carried thereby. When, for example, a replacement measuring strip is purchased for attachment to the outer ends of the coiling means 14, said replacement measuring strip or its extension is provided with such U-shaped holding means 40 secured thereto.

When the coiling means 14 and measuring strip have been interconnected by inserting the head 28 through the keyhole shaped opening 30 as aforesaid and the same have been extended so as to be longitudinally aligned, the parallel sides of the U-shaped holding means 40 will extend beside the parallel and juxtaposed edges of the outer ends of said coiling means 14 and measuring strip 16 and said sides may then be bent toward each other so as to be parallel to the central portion of the holding means 40 and against the outer surface of the coiling means 14 as clearly shown in Fig. 5. The bending of said sides may be performed by any suitable blunt object, and the same is readily accomplished since the holding means is readily bendable, being preferably formed of soft metal.

In order that the holding means 40, when bent into operative condition as shown in Figs. 1 and 5, will not interfere with the passage of the coiling means and measuring strip into the entrance slot 12 of the casing, the coiling means 14 is preferably formed of somewhat narrower strip material than the measuring strip 16 or its extension. The end of the measuring strip or its extension which is attached to the coiling means is also made reduced in width as clearly shown in the various figures, and the holding means 40 is secured to said narrowed end of the measuring strip or its extension. Thus, when the sides of the holding means are bent around the opposite sides of the connected ends of the coiling means and measuring strip, the distance between the outer surfaces of the ends of the connecting means 40 will be less than the width of the main part of the measuring strip and the length of the slot 12, and the thickness of the holding means is also less than the width of slot 12, thereby insuring ready passage of the connecting means therethrough.

When it is desired to separate a broken or damaged measuring strip from the coiling means 14, it is only necessary to withdraw the measuring strip and coiling means from the entrance slot 12 until aperture 24 is exposed. A pin or nail 26 is then inserted therethrough to prevent withdrawal of the outer end of the coiling means into casing 10. The bent sides of the holding means 40 are then pried upward by a knife or similar object from engagement with the outer surface of coiling means 14 and bent away therefrom sufficiently to permit removing the head 28 from the keyhole shaped opening 30 and thereby completely separate the broken or damaged measuring strip from the coiling means 14. A new measuring strip may then be attached to the coiling means 14 in the manner described above. The pin or nail 26 will then be withdrawn from aperture 24 and the replacement measuring strip is then ready for use.

It will thus be seen that the above described means for attaching ends of the measuring strip and coiling means are extremely simple, durable, easy and inexpensive to manufacture, will prevent accidental separation of the connecting means and yet, when it is desired to detach a broken or damaged measuring strip from the coiling means, the attaching means may be readily disconnected by the use of a knife or similar object to pry up the ends of the readily bendable holding means, whereupon the measuring strip and coiling means can be separated and a replacement measuring strip can likewise be easily and quickly secured to the coiling means as described in the foregoing.

While the invention has been illustrated and described in its preferred embodiment and has included certain details, it should be understood that the invention is not to be limited to the precise details herein illustrated and described since the same may be carried out in other ways, falling within the scope of the invention as claimed.

I claim as my invention:

In a measuring rule of the type comprising a casing having an entrance slot, a wind-up spring normally coiled within said casing and having its outer end extendable through the slot and a flexible coilable measuring blade of greater width than said spring for connection to the spring and having indicia on one side thereof, a detachable connection between the spring and blade which is freely movable through said entrance slot and which will not interfere with the coiling of the spring and blade within the casing comprising an outer end portion of the blade which is necked down to substantially the same width as the spring and having a keyhole slot, a blunt arrow-shaped head at the end of the spring insertable through said keyhole slot from either side of the blade, and a narrow strip of bendable metal secured intermediate its ends to the necked down end of the blade transversely thereof having its ends bendable about the edges of the blade and spring when the head of the spring is inserted through the keyhole slot from the side opposite the indicia.

FREDERICK A. VOLZ.

References Cited in the file of this patent

UNITED STATES PATENTS

| Number | Name | Date |
|---|---|---|
| 293,919 | Sprout | Feb. 19, 1894 |
| 686,711 | Cain | Nov. 19, 1901 |
| 2,080,815 | Gasstrom | May 18, 1937 |
| 2,510,939 | Carlson | June 6, 1950 |